US009704456B2

(12) United States Patent
Dayonot

(10) Patent No.: US 9,704,456 B2
(45) Date of Patent: Jul. 11, 2017

(54) KEYBOARD POSITIONING APPARATUS AND METHOD FOR RETROFITTING ONTO AN EXISTING PIANO ASSEMBLY

(71) Applicant: Timothy M. Dayonot, Oakland, CA (US)

(72) Inventor: Timothy M. Dayonot, Oakland, CA (US)

( * ) Notice: Subject to any disclaimer, the term of this patent is extended or adjusted under 35 U.S.C. 154(b) by 202 days.

(21) Appl. No.: 14/738,927

(22) Filed: Jun. 14, 2015

(65) Prior Publication Data

US 2015/0302835 A1 Oct. 22, 2015

(51) Int. Cl.
*G10C 3/12* (2006.01)
*B41J 3/407* (2006.01)
*B41J 11/00* (2006.01)
*B33Y 40/00* (2015.01)

(52) U.S. Cl.
CPC ................ *G10C 3/12* (2013.01); *B33Y 40/00* (2014.12); *B41J 3/4073* (2013.01); *B41J 11/002* (2013.01)

(58) Field of Classification Search
CPC ........................................................ G10C 3/12
USPC ....................... 84/423 R, 424, 425, 235, 446
IPC ......................................................... G10C 3/12
See application file for complete search history.

(56) References Cited

U.S. PATENT DOCUMENTS 240,930 A * 5/1881 Stearns .................... G10C 3/12 84/424
455,550 A * 7/1891 Thompson et al. ..... G10C 3/30 84/235
967,866 A * 8/1910 Watson .................. G10H 1/383 84/29
2,573,895 A * 11/1951 Evett ...................... G10H 1/344 200/18
2,630,503 A * 3/1953 Anderson .............. G10H 1/344 200/18
2,641,153 A * 6/1953 Enochs .................... G10C 3/22 84/236
2,761,344 A * 9/1956 Koehl ...................... G10C 5/00 84/171
2,950,642 A * 8/1960 Sluyter .................... G10C 3/12 84/236
2,996,941 A * 8/1961 Stiles ....................... G10C 3/12 84/434
3,026,760 A * 3/1962 Fauser ..................... G10C 3/12 84/423 R
3,330,176 A * 7/1967 Schwartz ................. G10B 3/12 84/433
4,127,051 A * 11/1978 Conklin, Jr. ............. G10C 3/04 84/423 R (Continued)

FOREIGN PATENT DOCUMENTS

DE 882641 C * 7/1953 ............... G10C 1/00

*Primary Examiner* — Ruth Ilan
(74) *Attorney, Agent, or Firm* — Christopher Pilling

(57) ABSTRACT

An apparatus is provided comprising a frame; an enclosure; a keyboard including a plurality of black and white keys; the plurality of black and white keys each having a top surface and a bottom surface; the enclosure having a surface finish; the enclosure encloses the frame and the keyboard, such each top surface of the plurality of black and white keys is exposed; the frame comprises a first beam, a second beam, a first keyboard support bar, a second keyboard support bar, a third keyboard support bar, a first guide pin rail, a second guide pin rail, and a third guide pin rail; the first, second, and third keyboard supports bars are perpendicular to the first and second beams.

13 Claims, 10 Drawing Sheets

(56) References Cited

U.S. PATENT DOCUMENTS 5,763,799 A * 6/1998 Kimble .................. G10H 1/346
84/433

* cited by examiner

KEYBOARD POSITIONING APPARATUS AND METHOD FOR RETROFITTING ONTO AN EXISTING PIANO ASSEMBLY

BACKGROUND OF THE INVENTION

1. Field of the Invention

The present invention relates to keyboard positioning on a grand piano hereinafter "piano", more particularly, to an improved keyboard positioning apparatus and method for retrofitting onto an existing piano assembly.

2. Description of Related Art

There are some problems and unmet needs with existing piano assemblies. Currently, a typical grand piano assembly has a keyboard that is positioned in a disadvantageous location, in which a spectator must be positioned at a certain angle in relation to the piano assembly to clearly view the piano player's hand and keyboard while the piano is being played. In a stage environment, the viewable angle is limited in such a way that typically only about half of the spectators can see a performer's hands and keyboard while playing the keyboard.

BRIEF SUMMARY OF THE INVENTION

In one embodiment, an apparatus is provided comprising a frame; an enclosure; a keyboard including a plurality of black and white keys; the plurality of black and white keys each having a top surface and a bottom surface; the enclosure having a surface finish; the enclosure encloses the frame and the keyboard, such each top surface of the plurality of black and white keys is exposed; the frame comprises a first beam, a second beam, a first keyboard support bar, a second keyboard support bar, a third keyboard support bar, a first guide pin rail, a second guide pin rail, and a third guide pin rail; the first, second, and third keyboard supports bars are perpendicular to the first and second beams; the first keyboard support bar has a first top surface, the first guide pin rail is affixed to the first top surface, the second keyboard support bar has a second top surface, the second guide pin rail is affixed to the second top surface, the third keyboard support bar has a third top surface, the third guide pin rail is affixed to the third top surface; the first guide pin rail includes a first plurality of guide pins; the second guide pin rail includes a second plurality of guide pins; the third guide pin rail includes a third plurality of guide pins; the white keys comprise a first mortise and a second mortise, the second mortise extending from the bottom surface to the top surface; the black keys comprise a third mortise and a forth mortise, the third mortise extending from the bottom surface to the top surface; the plurality of black and white keys are positioned such that: the first mortise aligns with the first plurality of guide pins, the second and third mortise align with the second plurality of guide pins, and the forth mortise aligns with the third plurality of guide pins.

In another embodiment, the apparatus further comprises an existing piano assembly comprising a case, a first lid, a second lid, a group of support legs, a pedal assembly, and an existing keyboard including a plurality of existing black and existing white keys; the case having an existing surface finish, the existing plurality of black and white keys having an existing top surface and an existing bottom surface.

In one embodiment, the enclosure is constructed from a thin wood material and the surface finish is identical to the existing surface finish of the case. In another embodiment, the apparatus further comprises a first plurality of rod assemblies, and a second plurality of rod assemblies, the first plurality of rod assemblies is attached to each bottom surface of the white keys and to each existing top surface of the existing white keys such that: when each top surface of the white keys is depressed, the movement and mechanical energy is translated through the first plurality of rod assemblies to the existing white keys; the second plurality of rod assemblies is attached to each bottom surface of the black keys and to each existing top surface of the existing black keys such that: when each top surface of the back keys is depressed, the movement and mechanical energy is translated through the second plurality of rod assemblies to the existing black keys.

In another embodiment, the plurality of black and white keys is positioned such that: each top surface is visible from increased perspective viewing angles. In yet another embodiment, the first and second plurality of rod assemblies are constructed from carbon fiber or a material with similar strength. Also in one embodiment, the second keyboard support bar has a trapezoidal shape. In another embodiment, each bottom surface includes a group of weights, the weights providing a means for adjusting the tactical feel, weight, and balance of each black and white key of the plurality of white and black keys.

In another aspect to the invention, a method is provided, comprising steps (a) providing an existing piano assembly comprising a case, a first lid, a second lid, a group of support legs, a pedal assembly, and an existing keyboard including a plurality of existing black and existing white keys; the case having an existing surface finish; the pedal assembly including a group of pedal shafts and a group of pedals, the existing plurality of black and white keys having an existing top surface and an existing bottom surface; (b) shorting the length of the group of support legs and group of pedal shafts; (c) extending the length of the group of pedals; (d) providing an improved keyboard assembly comprising an enclosure, a keyboard including a plurality of black and white keys, a first plurality of rod assemblies, and a second plurality of rod assemblies; the plurality of black and white keys each having a top surface and a bottom surface; the enclosure having a surface finish; the enclosure encloses the keyboard, such each top surface of the plurality of black and white keys is exposed; and (e) attaching the first plurality of rod assemblies to each bottom surface of the white keys and to each existing top surface of the existing white keys such that: when each top surface of the white keys is depressed, the movement and mechanical energy is translated through the first plurality of rod assemblies to the existing white keys; attaching the second plurality of rod assemblies to each bottom surface of the black keys and to each existing top surface of the existing black keys such that: when each top surface of the back keys is depressed, the movement and mechanical energy is translated through the second plurality of rod assemblies to the existing black keys.

In one embodiment, in step (d), the enclosure is constructed from a thin wood material and the surface finish is similar to the excising surface finish of the case. In another embodiment, in step (d), the plurality of black and white keys is positioned such that: each top surface is visible from increased perspective viewing angles. In yet another embodiment, in step (d), each bottom surface includes a group of weights, the weights providing a means for adjusting the tactical feel, weight, and balance of each black and white key of the plurality of white and black keys. In one embodiment, in step (e), the first and second plurality of rod assemblies are constructed from carbon fiber.

BRIEF DESCRIPTION OF THE SEVERAL VIEWS OF THE DRAWINGS

Referring to the drawings in which like reference character(s) present corresponding part(s) throughout.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

Figure 1:
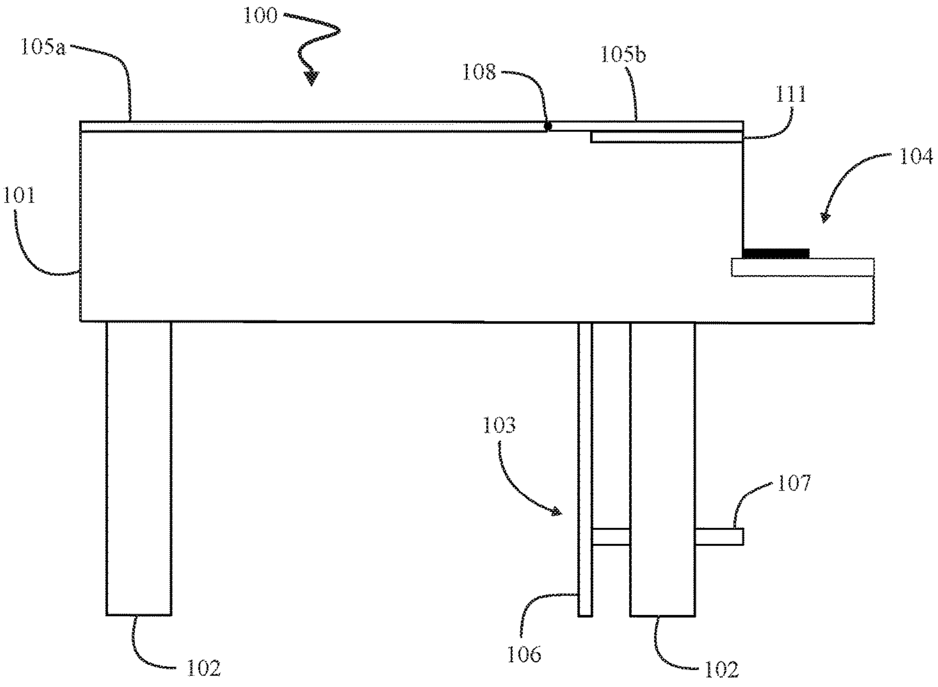
Fig. 1 Prior Art
FIG. 1 illustrates an existing piano assembly without the present invention installed.

FIG. 1 illustrates an existing piano assembly 100 without the present invention installed. FIG. 1 is not to scale, is for illustrative purposes only. The existing piano assembly comprises case 101, support legs 102, and pedal assembly 103. The case supports existing keyboard 104, front lid 105*b*, and rear lid 105*a*. Front and rear lids are connected by a lid hinge 108, allowing the front lid to fold back on the rear lid, best illustrated in FIG. 2*b*. The lids are the top most portion of the piano assembly and may be opened or closed as well known in the art. A removable sheet music desk 111 is positioned under front lid. The existing keyboard includes a plurality of white and black keys as known in the art. The pedal assembly comprises pedal shafts 106 and foot pedals 107.

In some embodiments, prior to the invention installation, the support legs and pedal assembly need to be modified. Specifically, support legs 102 and pedal shafts 106 are shortened in length to account for a piano player's new playing position while using the present invention. Likewise, foot pedals 107 are lengthened allowing the piano player to reach the foot pedals while using the present invention. The sheet music desk is also removed prior to installation.

Figure 2A:
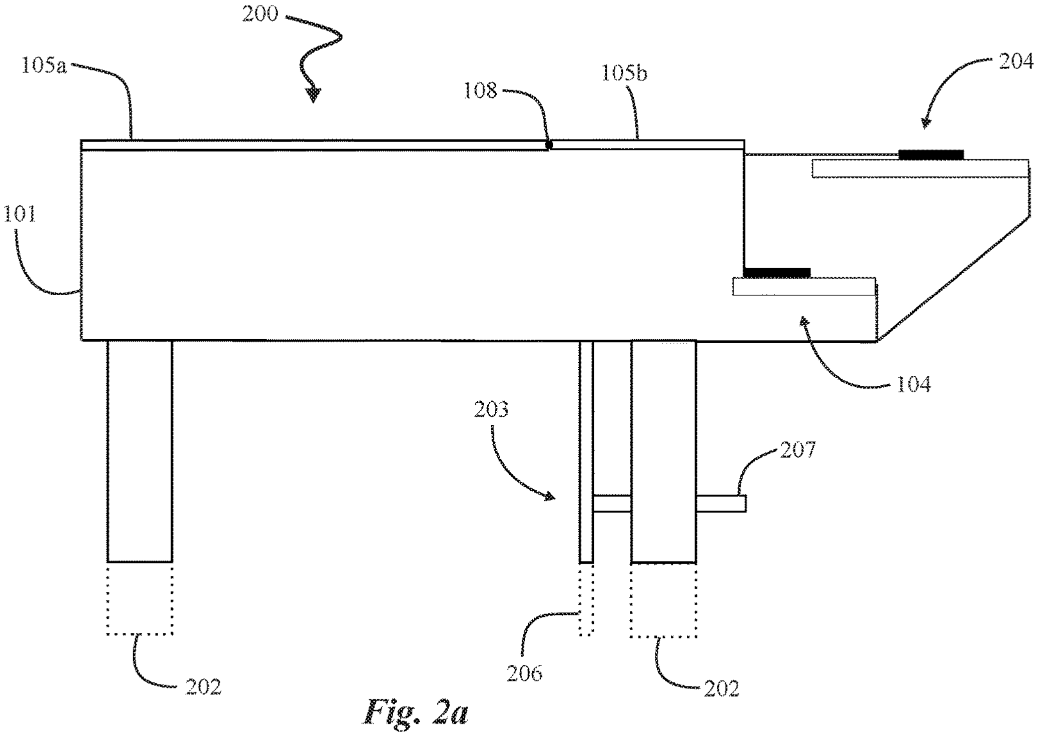
FIGS. 2*a-b* illustrate an improved keyboard positioning apparatus installed on an existing piano assembly according to an embodiment of the present invention.
Figure 2B:
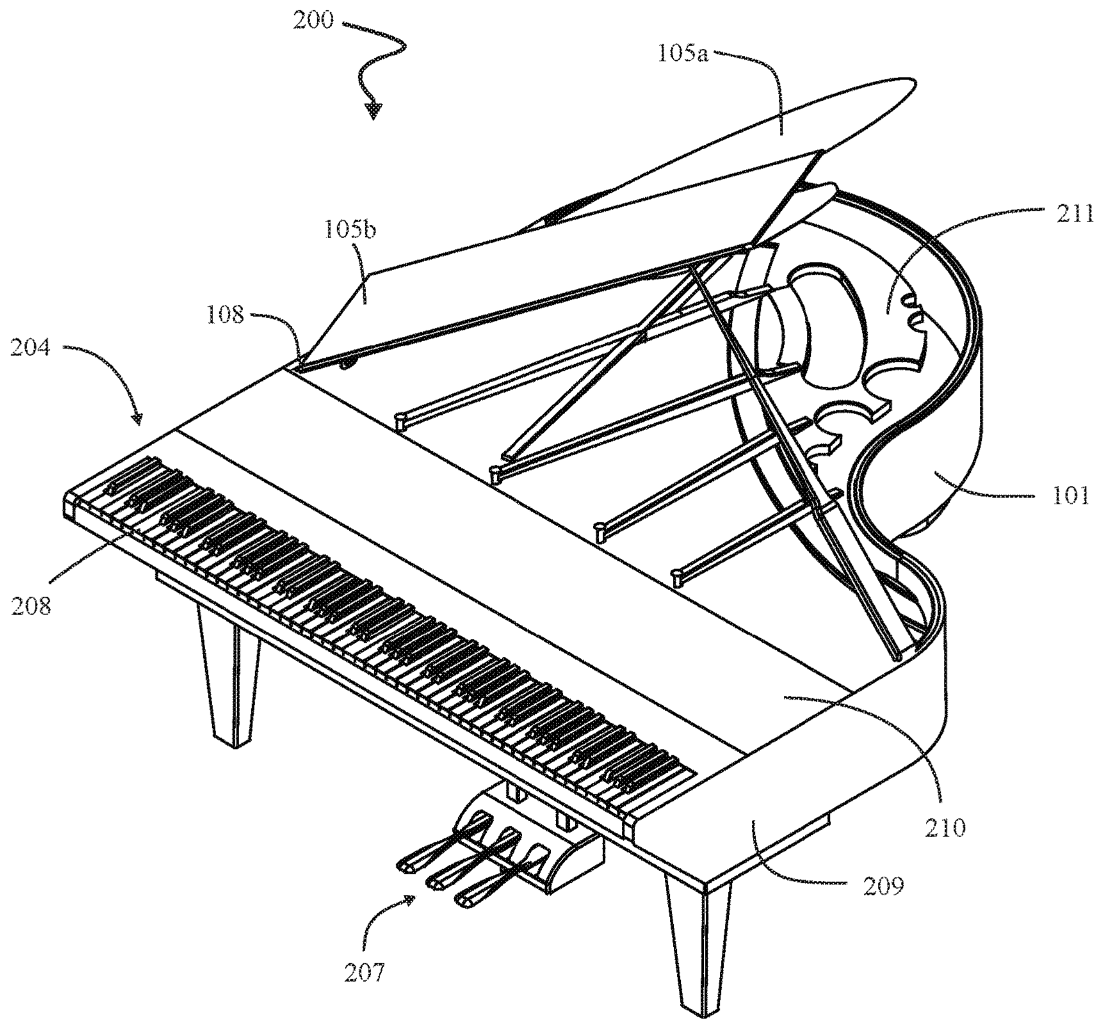

FIGS. 2*a-b* illustrates a piano assembly with an improved keyboard positioning apparatus 204 according to an embodiment of the present invention. Referring now to FIG. 2*a*, piano assembly 200 is illustrated. FIG. 2*a* is not to scale, is for illustrative purposes only. Piano assembly 200 comprises modified and unmodified components from the existing piano assembly 100 (FIG. 1) and the improved keyboard positioning apparatus 204. The unmodified components include case 101, existing keyboard 104, front lid 105*b*, rear lid 105*b*, and lid hinge 108. The modified components include modified support legs 202 and modified pedal assembly 203. The modified pedal assembly comprises modified pedal shafts 206 and modified foot pedals 207. Specifically, the modified support legs and pedal shafts are shortened in length, while the modified foot pedals are extended in length.

Referring now to FIG. 2*b*, piano assembly 200 with the improved keyboard positioning apparatus is illustrated. In the current embodiment, front lid 105*b* is folded back onto rear lid 105*a*, exposing piano mechanisms 211, which include but are not limited to a piano frame, bridge, and strings. Improved keyboard positioning apparatus 204 comprises an improved keyboard 208 including a plurality of white and black keys. The plurality of white and black keys is identical to the plurality of white and black keys of the existing keyboard. It is essential that the plurality of white and black keys is the same width of the plurality of white and black keys of the existing keyboard. The improved keyboard is designed so that when the improved keyboard is played, and the plurality of white and black keys is depressed, the mechanical energy translates to the plurality of white and black keys of existing keyboard 104 (FIG. 2*b*), which activates the piano action mechanism and creates sound by striking the piano strings as well known in the art. The details of the apparatus will be described below to provide a more thorough understanding of the present invention.

Still referring to FIG. 2*b*, the improved keyboard positioning apparatus further comprises an enclosure 209. The enclosure protects and conceals the components of the apparatus. The enclosure is preferably constructed from a thin wood material or the like. Ideally, the finish of the enclosure should match or appear similar to the existing case 101. The improved keyboard positioning apparatus is positioned so that improved keyboard 208 is aligned with lids 105*a* and 105*b*, when lids are in the closed position as seen in FIG. 2*a*. This positioning allows keyboard to be visible from nearly 360 degrees of viewing angle while the lid is down, in contrast to existing piano assemblies wherein a spectator must be positioned at a certain angle in relation to the piano assembly to view the keyboard while the piano assembly is being played. In some embodiments, an acoustic grill 210 is provided. The acoustic grill allows sound from the piano assembly to efficiently travel to the surrounding environment when the lids are in a closed position.

Figure 3A:
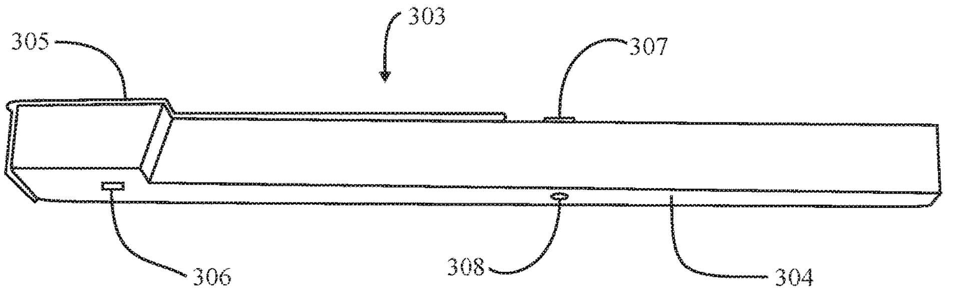
FIG. 3*a* is a side perspective view showing a white key of the improved keyboard positioning apparatus according to an embodiment of the present invention.

FIG. 3*a* is a side perspective view showing a white key 303 of the improved keyboard positioning apparatus according to an embodiment of the present invention. The white key comprises key body 304 and key top 305. The key top is a veneer of white color typically made of a plastic, while the key body consists of a soft wood material including but not limited to conifer, sugar pine, basswood, and spruce. The key body includes front mortise 306 and center mortise 307/308. Both mortises are lined with bushing cloth, classically consisting of red felt.

Figure 3B:
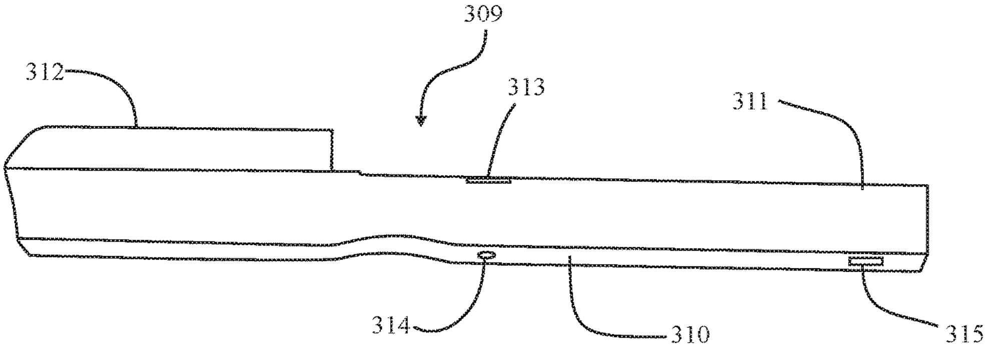
FIG. 3*b* is a side perspective view showing a black key of the improved keyboard positioning apparatus according to an embodiment of the present invention.

FIG. 3*b* is a side perspective view showing a black key 309 of the improved keyboard positioning apparatus according to an embodiment of the present invention. The black key comprises key body 310, rear portion 311, and key top 312. The key top is a black color typically made of a plastic, while the key body consists of a soft wood material including but not limited to conifer, sugar pine, basswood, and spruce. The key body includes center mortise 313/314, while the rear portion includes rear mortise 315. Both mortises are lined with bushing cloth, classically consisting of red felt. Typically, mortise 315 is located near the front of the key body, however to provide clearance for other components of the improved keyboard positioning apparatus, the mortise is recreated on rear portion 311. Furthermore, it shall be noted that both the white and black keys include key bodies that are straight lengthwise, opposed to common curved key bodies found in virtually all acoustic pianos. It is understood that the white key 303 (FIG. 3*a*) and black key 309 represent all keys comprising the plurality of white and black keys of the improved keyboard positioning apparatus.

Figure 4:
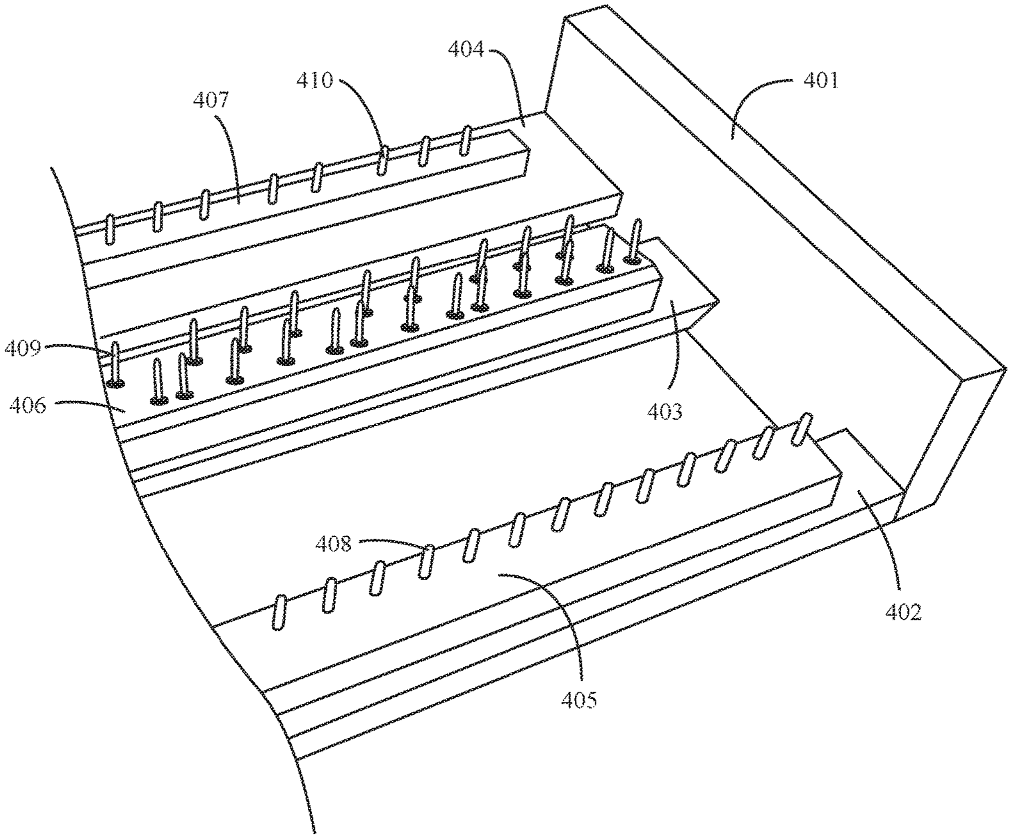
FIG. 4 is a perspective view showing components of the improved keyboard positioning apparatus according to an embodiment of the present invention.

FIG. 4 is a perspective view showing components of the improved keyboard positioning apparatus according to an embodiment of the present invention. As previously mentioned, the apparatus includes enclosure 209 (FIG. 2*b*). The enclosure comprises a first vertical side beam 401, which is connected to the existing case 101 (FIG. 2*b*). The first vertical side beam holds front keyboard support bar 402, middle keyboard support bar 403, and rear keyboard support bar 404. The middle keyboard support bar has the profile of a trapezoid, in which the top and bottom surfaces are parallel and the surface facing the front keyboard support bar is angled. This provides ample clearance to components of the improved keyboard positioning apparatus that will be described below. Although not illustrated, it is understood that an identical second vertical side beam is positioned across from the first vertical side beam for the attachment and support of front, middle, and rear keyboard support bars.

Still referring to FIG. 4, front keyboard support bar 402 holds front guide rail 405. The front guide rail comprises front guide pins 408 which guide and align the white keys by means of front mortise 306 (FIG. 3*a*) while the keys are played. The guide pins also prevent the keys from any lateral movement while the keyboard is played. Similarly, rear keyboard support bar 404 holds rear guide rail 407. The rear guide rail comprises rear guide pins 410 which guide and align the black keys by means of rear mortise 315 (FIG. 3*b*) while the keys are played. Likewise, the guide pins also prevent the keys from any lateral movement while the keyboard is played. Middle keyboard support bar 403 holds middle guide rail 406. The middle guide rail comprises balance pins 409 which also prevent lateral movement of the plurality of white and black keys by means of center mortise 307/308 (FIG. 3*a*) and center mortise 313/314 (FIG. 3*b*) while allowing the keys to pivot as well known in the art.

Figure 5:
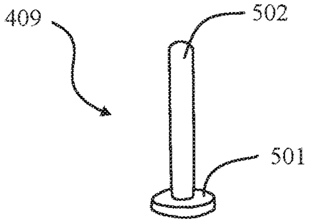
FIG. 5 is a detailed view of a balance pin of the improved keyboard positioning apparatus according to an embodiment of the present invention.

FIG. 5 is a detailed view of a balance pin 409 of the improved keyboard positioning apparatus according to an embodiment of the present invention. The balance pin comprises a balance pin punching 501 and a cylindrical shaft 502. The balance pin punching is made from a bushing cloth material as known in the art.

Figure 6A:
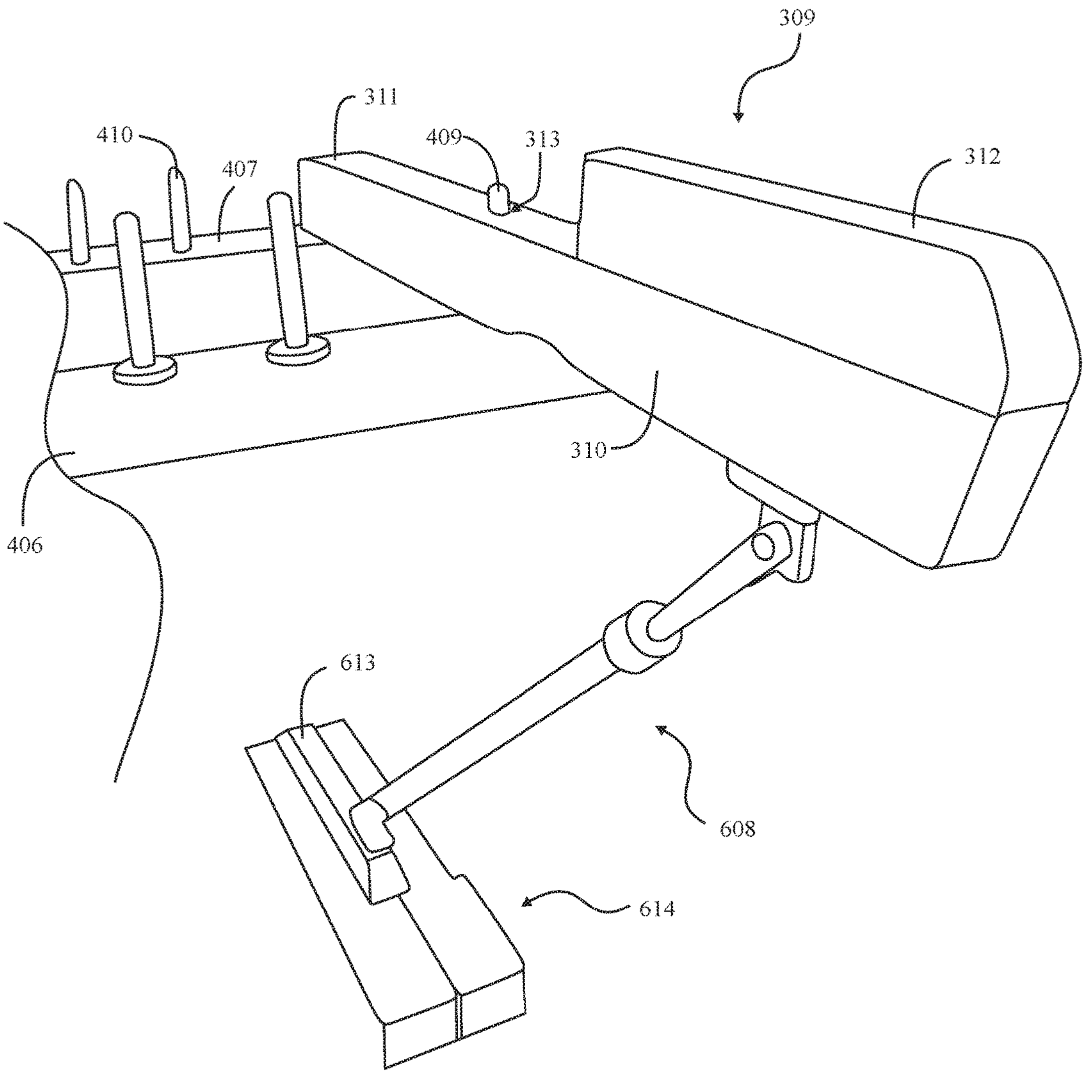
FIGS. 6*a-c* illustrate an installed black key and rod assembly of the improved keyboard positioning apparatus according to an embodiment of the present invention.
Figure 6B:
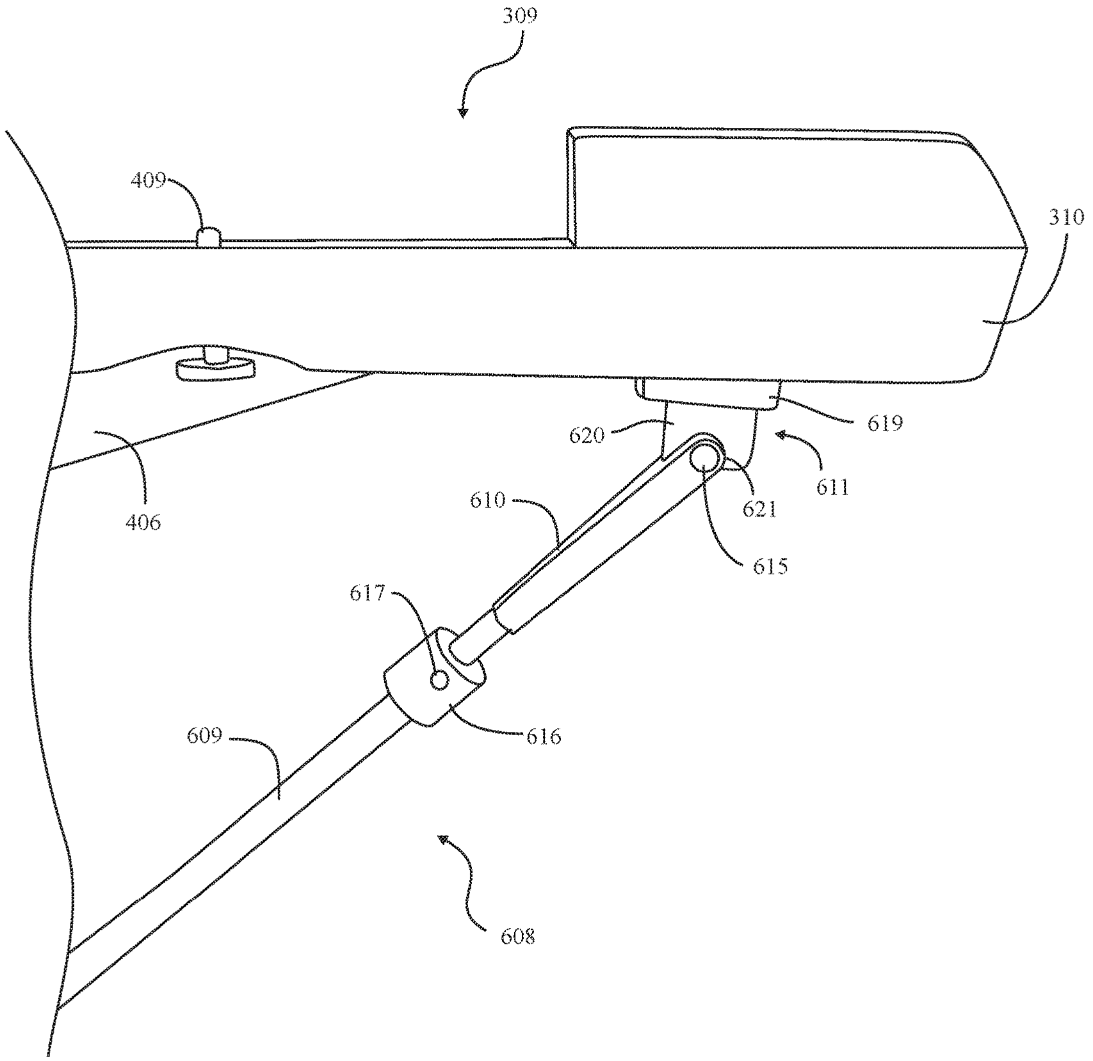
Figure 6C:
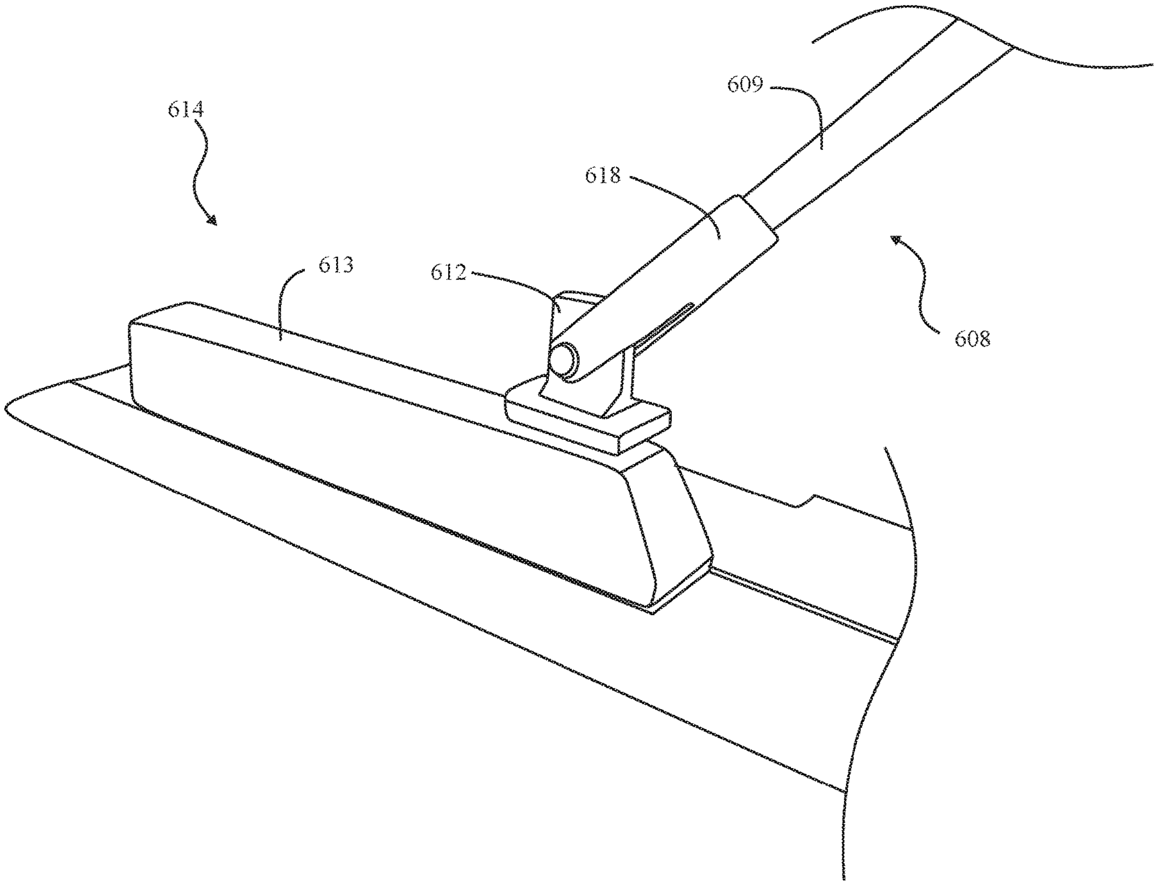

FIGS. 6*a-c* illustrate an installed black key 309 and rod assembly 608 of the improved keyboard positioning apparatus according to an embodiment of the present invention. FIG. 6*a* is a perspective view of the installed black key and rod assembly of the improved keyboard positioning apparatus. Referring now to FIG. 6*a*, the black key comprises key body 310, rear portion 311, and key top 312. Rear mortise 315 (FIG. 3*b*) of rear portion is positioned on guide pin 410 of rear guide rail 407, while center mortise 313/314 (FIG. 3*b*) is positioned on balance pin 409 of middle guide rail 406. By means of a rod assembly 608, the black key is connected to the existing keyboard 614, and more specifically to an existing black key 613 of the existing keyboard. When key top 610 is depressed, the movement and mechanical energy is translated through the rod assembly to the existing black key. Although a single black key is shown it is understood that this process is repeated for the plurality of black keys completing the standard piano keyboard.

It is important to note that the feel of the improved keyboard virtually mimics the existing keyboard in terms of tactical feel, weight, and balance. Additionally, since the translated motion is simultaneous there is no delay in the piano action mechanism.

FIG. 6*b* is a side view illustrating the installed black key 309 and rod assembly 608 of the improved keyboard positioning apparatus. Referring now to FIG. 6*b*, rod assembly 608 comprises a shaft 609, a first end connector 610, and a coupler 616. The rod assembly is connected to the key body by means of a first pivot bracket 611. The first pivot bracket comprises a flange 619 and a post 620. The post comprises an aperture 621. The flange is mounted to the bottom surface of the key body using a suitable method known in the art, such as an adhesive. A connecting pin 615 is positioned through the aperture, which connects the pivot bracket to the first end connector. The first end connector is linked to shaft 609 by use of coupler 616 and set screw 617. The rod assembly and pivot brackets may be selected from a variety of materials including but not limited to carbon fiber.

FIG. 6*c* is a detailed view showing the rod assembly of the improved keyboard positioning apparatus. Referring now to FIG. 6*c*, it can be seen that shaft 609 of the rod assembly 608 is connected to a second end connector 618, which is linked to a second pivot bracket 612 in similar manner discussed above. In some embodiments, the shaft is connected to the second end connector using an adhesive or mechanical method known in the art, however it is understood that an additional coupler may be used in a similar fashion to coupler 616 (FIG. 6*b*). The second pivot bracket is mounted on an existing black key 613 of the existing keyboard 614 using an adhesive or mechanical means.

Figure 7:
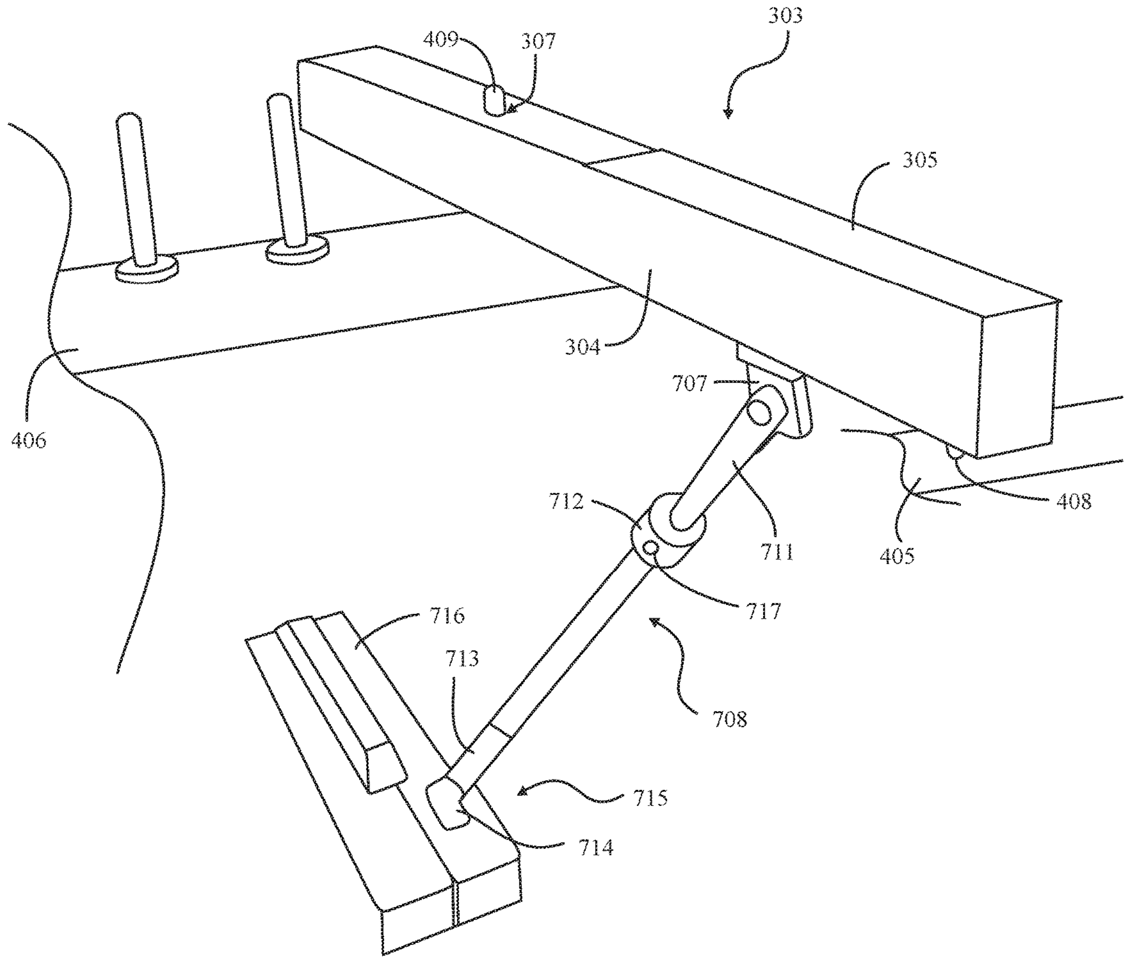
FIG. 7 is a perspective view showing an installed white key 700 and rod assembly of the improved keyboard positioning apparatus according to an embodiment of the present invention.

FIG. 7 is a perspective view showing an installed white key 303 and rod assembly 708 of the improved keyboard positioning apparatus according to an embodiment of the present invention. The white key includes key body 304 and key top 305. Front mortise 306 (FIG. 3*a*) is positioned on guide pin 408 of the front guide rail 405, while center mortise 307/308 (FIG. 3*a*) is positioned on balance pin 409 of middle guide rail 406. Rod assembly 708 comprises a shaft 709, a coupler 711, a first end connector 712, a second end connector 713, a first pivot bracket 707, and a second pivot bracket 714. The first pivot bracket is mounted to the bottom of key body 304 using a suitable method known in the art, such as an adhesive or mechanical means. The second pivot bracket is attached to the second end connector, which in turn is connected to shaft 709 by use of coupler 711 and set screw 717. The second pivot bracket is also mounted to an existing white key 716 of the existing keyboard 715 using an adhesive or mechanical means. Although one set screw is shown, it is understood that two set screws may be used, to further secure the connection between the shaft and the first end connector.

Still referring to FIG. 7, by means of rod assembly 708, the white key is connected to the existing keyboard 715, and more specifically the existing white key of the existing keyboard. When key top 305 is depressed the movement and mechanical energy is translated through the rod assembly to the existing white key. Although a single installed white key is shown, it is understood that this process is repeated for the plurality of white keys completing the standard piano keyboard.

Figure 8A:
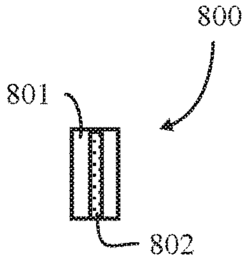
FIG. 8*a* illustrates a pivot bracket of the improved keyboard positioning apparatus according to an embodiment of the present invention.

FIG. 8*a* illustrates a pivot bracket 800 of the improved keyboard positioning apparatus according to an embodiment of the present invention. The pivot bracket comprises a thin flange portion 801 and a post portion 802. In some embodiments, the post portion is centered on the flange portion. In other embodiments, the post portion is shifted to the left and right of the center of the flange portion. Each type of pivot bracket will be discussed in greater detail below.

Figure 8B:
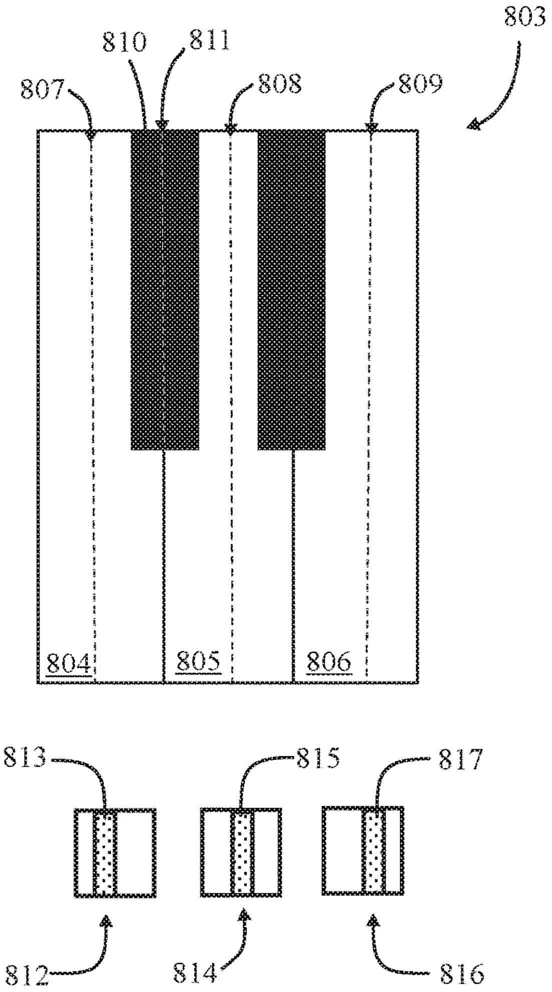
FIG. 8*b* is diagram showing the mounting location for each pivot bracket of the improved keyboard positioning apparatus according to an embodiment of the present invention.

FIG. 8*b* is diagram showing the mounting location for each pivot bracket of the improved keyboard positioning apparatus according to an embodiment of the present invention. Specifically, the diagram illustrates the mounting location for each pivot bracket and the type of each pivot bracket used for each mounting location including the mounting location for the existing keyboard and the mounting location for the improved keyboard. Existing keyboard 803 comprises four different types of key top configurations including the conventional black and white key top shapes which include black key top 810 and white key top shapes 804-806.

Still referring to FIG. 8*b*, type 1 pivot brackets 812 are mounted and centered on black key tops 810 and centerline 811. The type 1 pivot bracket has a flange portion 813 and a post portion 818, in which the post portion is centered on the flange. Type 2 pivot brackets 815 are mounted on white key top shapes 804 and centerline 807. The type 2 pivot bracket has a wide flange portion 816 and post portion 871, the post portion is offset to the left side of the flange portion and is centered in relation to the narrow section of the key top, represented by centerline 807. Type 3 pivot brackets 818 are mounted and centered on white key top shapes 806. The type 3 pivot bracket has a wide flange 819 and post portion 820; the port portion is offset to the right side of the flange portion and is centered in relation to the narrow section of the key top, represented by centerline 809. Type 1 pivot brackets 812 are also used for mounting on white key top shapes 805, in which post portion 804 is mounted on centerline 808. Further, Type 1 pivot brackets 802 are also used for all mounting locations on the improved keyboard (as seen in FIGS. 6*a*-*b* and FIG. 7). The type 1 pivot bracket in these arrangements are simply rotated 180 degrees, in which flange portion 813 is centered and mounted on both the black and white key top bottoms as illustrated.

Figure 9A:
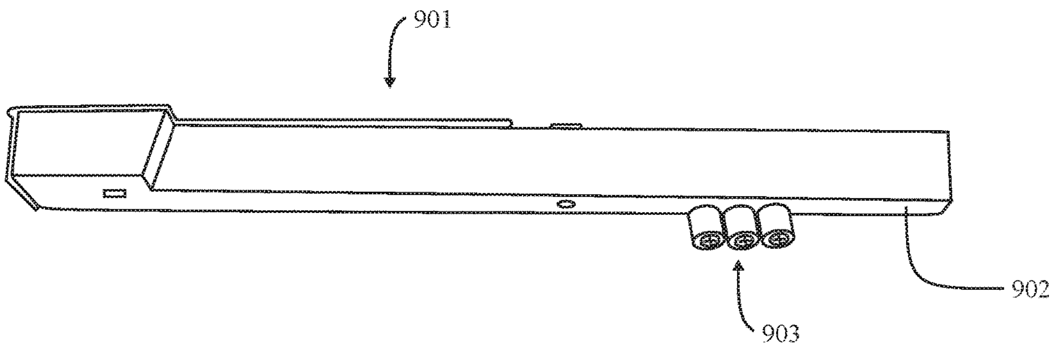
FIGS. 9*a-b* illustrate side perspective views of a white key and a black key of the improved keyboard positioning apparatus according to an embodiment of the present invention.
Figure 9B:
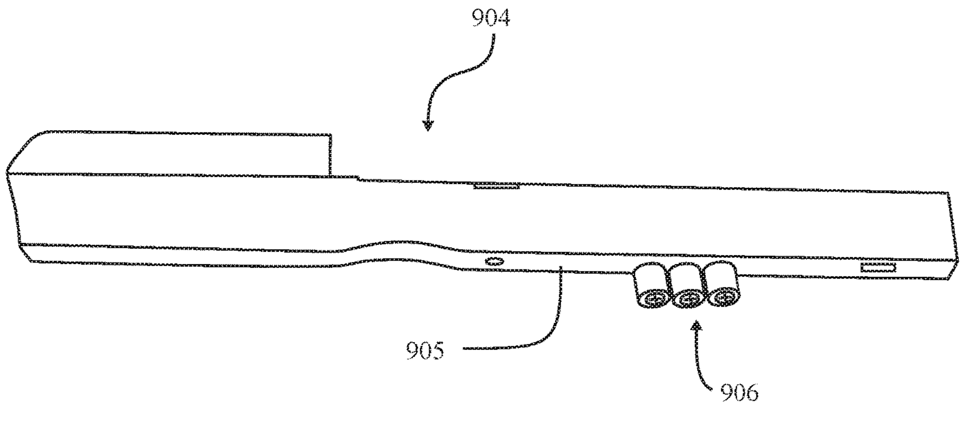

FIGS. 9*a*-*b* illustrate side perspective views of a white key 901 and a black key 902 of the improved keyboard positioning apparatus according to an embodiment of the present invention. Specifically, white key 901 and black key 902 include adjustable weights 903, 906. The adjustable weights are attached to the keyboard with attachment means, including but not limited to screws. Each key represents the plurality of white and black keys on the keyboard apparatus. Although three lead weights are shown on each key, it will be understood that any number of weights may be present using a variety of materials. A user may add or remove weights as a means of adjusting the tactical feel, weight, and balance of each piano key of the plurality of white and black keys on the keyboard apparatus.

In alternative embodiments, pivot brackets may be mounted on linear rails allowing the position of each pivot bracket to be adjusted. Specifically, each pivot bracket is permitted to move back and forth along the linear rails. In the same scope, adjustable weights may be added to the rear of the plurality of white and black keys on the keyboard apparatus. Likewise, the length of keys may be altered and/or the rear of key bodies may be replaced with rods allowing a user to easily adjust and add counter weights of each piano key of the plurality of white and black keys on the keyboard apparatus. The modifications in an alternative embodiment mentioned above are means of adjusting the tactical feel, weight, and balance of each piano key of the plurality of white and black keys on the keyboard apparatus.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. For example, although a keyboard apparatus designed to be retrofitted to an existing piano assembly is shown, a complete piano assembly comprising an improved keyboard position can be manufactured. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. An apparatus comprising:

a frame;

an enclosure;

a keyboard including a plurality of black and white keys;

the plurality of black and white keys each having a top surface and a bottom surface;

the enclosure having a surface finish;

the enclosure encloses the frame and the keyboard, such that each top surface of the plurality of black and white keys is exposed;

the frame comprises a first beam, a second beam, a first keyboard support bar, a second keyboard support bar, a third keyboard support bar, a first guide pin rail, a second guide pin rail, and a third guide pin rail;

the first, second, and third keyboard supports bars are perpendicular to the first and second beams;

the first keyboard support bar has a first top surface, the first guide pin rail is affixed to the first top surface, the second keyboard support bar has a second top surface, the second guide pin rail is affixed to the second top surface, the third keyboard support bar has a third top surface, the third guide pin rail is affixed to the third top surface;

the first guide pin rail includes a first plurality of guide pins;

the second guide pin rail includes a second plurality of guide pins;

the third guide pin rail includes a third plurality of guide pins;

the white keys each comprise a first mortise and a second mortise, the second mortise extending from the bottom surface to the top surface of a respective white key;

the black keys each comprise a third mortise and a fourth mortise, the third mortise extending from the bottom surface to the top surface of a respective black key;

the plurality of black and white keys are positioned such that:

the first mortise aligns with the first plurality of guide pins, the second and third mortise align with the second plurality of guide pins, and the fourth mortise aligns with the third plurality of guide pins.

2. The apparatus of claim 1, further comprising an existing piano assembly comprising a case, a first lid, a second lid, a group of support legs, a pedal assembly, and an existing keyboard including a plurality of existing black and existing white keys; the case having an existing surface finish; the existing plurality of black and white keys having an existing top surface and an existing bottom surface.

3. The apparatus of claim 2, wherein the enclosure is constructed from a thin wood material and the surface finish is similar to the existing surface finish of the case.

4. The apparatus of claim 3, further comprising a first plurality of rod assemblies, and a second plurality of rod assemblies, each of the first plurality of rod assemblies is attached to the bottom surface of a respective white key and to a respective existing top surface of a respective existing white key such that: when each top surface of the white keys is depressed, the movement and mechanical energy is translated through the first plurality of rod assemblies to the respective one of the existing white keys; each of the second plurality of rod assemblies is attached to the bottom surface of a respective black key and to each existing top surface of the a respective existing black key such that: when each top surface of the back keys is depressed, the movement and mechanical energy is translated through the second plurality of rod assemblies to the respective one of the existing black keys.

5. The apparatus of claim 4, wherein the plurality of black and white keys is positioned such that: each top surface is visible from 360 degrees of a perspective viewing angle.

6. The apparatus of claim 4, wherein the first and second plurality of rod assemblies are constructed from carbon fiber.

7. The apparatus of claim 1, wherein the second keyboard support bar has a trapezoidal shape.

8. The apparatus of claim 1, wherein each bottom surface includes a group of weights, the weights providing a means for adjusting the tactical feel, weight, and balance of each black and white key of the plurality of white and black keys.

9. A method comprising steps:

(a) providing an existing piano assembly comprising a case, a first lid, a second lid, a group of support legs, a pedal assembly, and an existing keyboard including a plurality of existing black and existing white keys; the case having an existing surface finish; the pedal assembly including a group of pedal shafts and a group of pedals, the existing plurality of black and white keys having an existing top surface and an existing bottom surface;

(b) shortening the length of the group of support legs and group of pedal shafts;

(c) extending the length of the group of pedals;

(d) providing an improved keyboard assembly comprising an enclosure, a keyboard including a plurality of black and white keys, a first plurality of rod assemblies, and a second plurality of rod assemblies; the plurality of black and white keys each having a top surface and a bottom surface; the enclosure having a surface finish; the enclosure encloses the keyboard, such each top surface of the plurality of black and white keys is exposed; and (e) attaching each of the first plurality of rod assemblies to the bottom surface of a respective white key and to a respective existing top surface of a respective existing white key such that: when each top surface of the white keys is depressed, the movement and mechanical energy is translated through the first plurality of rod assemblies to the respective one of the existing white keys; attaching the second plurality of rod assemblies to the bottom surface of a respective black key and to a respective existing top surface of a respective existing black key such that: when each top surface of the back keys is depressed, the movement and mechanical energy is translated through the second plurality of rod assemblies to the respective one of the existing black keys.

10. The method of claim 9, wherein in step (d), the enclosure is constructed from a thin wood material and the surface finish is similar to the existing surface finish of the case.

11. The method of claim 9, wherein in step (d), the plurality of black and white keys is positioned such that: each top surface is nearly visible from 360 degrees of a perspective viewing angle.

12. The method of claim 9, wherein in step (d), each bottom surface includes a group of weights, the weights providing a means for adjusting the tactical feel, weight, and balance of each black and white key of the plurality of white and black keys.

13. The method of claim 9, wherein in step (e), the first and second plurality of rod assemblies are constructed from carbon fiber.

* * * * *